Patented Dec. 19, 1933

1,939,647

UNITED STATES PATENT OFFICE 1,939,647

METHOD OF IMPREGNATING POROUS MATERIALS

Herrick R. Arnold and Wilbur A. Lazier, Elmhurst, Del., assignors to E. I. du Pont de Nemours & Company, Wilmington, Del., a corporation of Delaware No Drawing. Application July 23, 1930
Serial No. 470,219

14 Claims. (Cl. 23—233)

This invention relates to the preparation and use of impregnated porous materials, and more particularly to a method for the preparation of catalysts for gas phase reactions, such as the catalytic dehydration of organic compounds, wherein the porous support is treated prior to impregnation to remove absorbed or adsorbed gases or liquids.

In the preparation of contact materials for gas phase reactions it is often desirable or necessary to support the active catalytic material upon some inert or relatively inactive material which usually possesses an extensive surface. Materials usually employed as catalysts often do not lend themselves readily to methods of preparation by which extensive catalytic surfaces may be obtained. On the other hand, materials having the desired surface area may be entirely unsuitable as catalysts by virtue of their chemical constitution. By combining the active catalyst with a material having an extensive surface, it is possible to obtain a given catalyst in a form having the desired surface area.

Several methods have already been proposed for incorporating catalytic materials with non-catalytic supports. Probably the best known example of such a supported catalyst is the use of kieselguhr as a supporting material for active nickel catalysts. Active carbon has also found frequent use for the preparation of nickel and certain other types of metallic catalysts. Ordinarily, these supporting materials are impregnated with the active catalytic material by treating them with a solution of a soluble compound of the catalytic metal or an oxide, followed by precipitation of the metal in an insoluble form. Special methods are applicable only to catalysts supported on porous gels such as silica gel.

According to U. S. Patent 1,577,189, an active gel catalyst may be prepared by precipitating a solution of sodium silicate with a solution of an easily hydrolyzable metallic salt, such as ferric chloride. After thorough washing, a silica gel is obtained which contains iron oxide imbedded within the gel. Another method has been proposed in British Patent 280,939, in which a hydrogel containing about 90% of water is prepared and washed free from impurities. It is then immersed in a solution of a decomposable metallic salt and carefully dried in such a way that the dry rigid gel obtained contains within its pores a portion of the dried salt. The composition is then heated to a temperature suitable for decomposing the metallic salt to yield an oxide or metal in a catalytically active form.

U. S. Patents 1,739,306 and 1,739,307 also describe methods whereby silica gel may be impregnated with catalytic material. According to the first of these, there is distributed through substantially all of the pores of a dry gel, a solution containing a mixture of a soluble compound of a metal and a reducing agent which is incapable of attacking the gel structure, at such a temperature that the metallic compound is not appreciably reduced and then subjecting the porous solid to such an elevated temperature that the metallic compound is reduced and the catalytic metal deposited through all the pores of the gel. According to the second patent, a soluble substance capable of producing a catalytically active material is introduced into substantially all of the capillaries of the porous gel and treated with a soluble gas capable of reacting with the metallic compound and then causing diffusion through the capillaries of a solvent in which the precipitating action takes place.

It has generally been considered necessary that a material such as silica gel should be only partially dried when the impregnating solution is added, since dry gels prepared according to the prior art methods have a tendency to shatter when immersed in water or other liquids.

The simplest method of preparing such impregnated supported catalysts consists in soaking the porous support with a solution of catalytic material and drying or igniting the product. We have found, however, that this method has proved to be inferior for the reason that all highly porous materials, such as silica gel and activated carbon, contain gases within the pores which prevent the entrance and uniform distribution of the catalytic material.

This invention has as an object to overcome the above mentioned prior art difficulties. A further object is to provide an improved method of making impregnated porous catalysts. A still further object is to provide a method which will effectively remove absorbed or adsorbed gases from the porous support and make possible the absorption or diffusion of the maximum amount of catalytic material. A specific object is to provide a new and improved supported oxide catalyst which is especially suitable for the catalytic dehydration of organic compounds.

These objects are accomplished by the following invention which, in its general aspects, comprises the treatment of porous solids which are to be impregnated with catalytic material by heating them in a vacuum, cooling to a temperature below the boiling point of the impregnating solution, and thereafter adding to the evacuated, cooled, supporting material while still under partial vacuum a solution of a salt of a catalytic metal which is capable of yielding the active catalytic component.

In the following examples we have set forth several of the preferred embodiments of our invention, but they are presented only for purposes of illustration and not as a limitation:—

*Example 1.*—550 cc. of a dry, hard, rigid, silica gel, screened to 6–14 mesh, and weighing 235 g. was placed in a Pyrex tube and exhausted for 4 hours at a pressure of less than 1 mm. and a temperature of about 400° C. At the end of this period, the gel was cooled to room temperature, and while still being exhausted was covered with a solution of 100 g. of crystallized aluminum nitrate dissolved in 500 cc. of water. Air was then admitted and the solution allowed to stand in contact with the gel for 12 hours, after which the surplus liquid was poured off and the gel dried at 100° C. It was then ignited for 4 hours at 400–450° C. The product weighing 224 g. was bluish-white and contained 2.45% by weight of aluminum oxide.

By way of showing the improvement caused by using this method of impregnation, another preparation was made in a manner similar in every respect to the first, except that instead of adding the impregnating solution to an evacuated gel, the gel was merely soaked for the same length of time in the aluminum nitrate solution. After drying and igniting, this preparation contained only 2.1% of aluminum oxide, showing that the aluminum nitrate had not entered the interior of the gel particles to the extent that it had when the gel was outgassed in the impregnating process.

*Example 2.*—300 cc. of dry crushed silica gel was evacuated for about 4 hours to less than 1 mm. pressure at 400° C., cooled to room temperature in the vacuum, and treated with a solution prepared by dissolving 4.3 g. of aluminum metal in 300 cc. of water containing 50 g. of oxalic acid. The gel was strained and dried and ignited at 400° C., after which the aluminum oxide content was 3.3%.

*Example 3.*—48 g. of active charcoal, such as is used for gas-mask absorbent and solvent recovery, was outgassed at 400° C. and 5 mm. pressure for at least 2 hours, cooled and treated with a solution consisting of 20 g. of dihydrogen ammonium phosphate dissolved in 150 cc. of water. After allowing the solution to stand in contact with the carbon for 10 hours, the latter was removed from the excess liquid and dried at 100° C.

*Example 4.*—Diatomaceous earth was prepared in a granular form by compressing at high pressure. It was then heated to 450° C. and pumped off at a pressure of less than 10 mm. When no more gas or water could be removed, the supporting material was cooled to room temperature and covered under vacuum with a solution containing 20 g. of aluminum nitrate dissolved in 100 cc. of water. The excess solution was removed by filtration and the solid product dried and ignited at 400° C. The finished catalyst contained 4.0% of aluminum oxide.

*Example 5.*—100 g. of unglazed porcelain was outgassed for more than 2 hours at 400° C. and a pressure of about 1 mm. and treated with a solution of 20 g. of aluminum nitrate dissolved in 100 cc. of water. After drying, the supported aluminum nitrate was heated to 400° C. to convert the aluminum nitrate into a catalytically active aluminum oxide.

*Example 6.*—One hundred cc. of activated carbon, such as is prepared by the controlled ignition of hard wood or nut shells, weighing about 45 g., was digested with 50% nitric acid, washed and dried. The carbon was then placed in a closed vessel and subjected to a temperature of 400° C. and a vacuum of 1 mm. for 8 hours. After cooling in the vacuum, the outgassed carbon was covered with a 20% solution of aluminum nitrate for several hours. The impregnated carbon was drained, dried and ignited at 400° C. in a loosely covered vessel, after which the alumina content was 4.3%.

*Example 7.*—A very satisfactory catalyst for use in chlorination or hydro-chlorination may be prepared by impregnating a porous support with one or more metallic chlorides. One hundred twenty-five cc. of purified wood charcoal, weighing about 50 g., was outgassed overnight at 2 mm. pressure and 450° C., after which the carbon was cooled and treated in a vacuum with 125 cc. of 20% ferric chloride solution. After soaking for 2 hours, the surplus liquid was poured off and the solid product dried at 100° C. and found to have an anhydrous ferric chloride content of 13.9% by weight.

Tests were made to determine the influence of concentration of the impregnating solution on the concentration of aluminum oxide obtained on the finished impregnated silica gel. Following the procedure described in Example 1 above, successive samples of outgassed silica gel were treated with 15%, 20% and 40% solutions of aluminum nitrate. The impregnated, ignited gels were analyzed for aluminum oxide and gave the following results:

| Aluminum nitrate concentration of impregnating solution | $Al_2O_3$ content of impregnated gel |
|---|---|
| Percent | Percent |
| 15 | 2.45 |
| 25 | 2.45 |
| 40 | 4.00 |

From the above it may be observed that the concentration of the catalyst on the solid support may be controlled to a certain extent by alteration of the concentration of the impregnating solution.

For use as catalysts, the concentration of catalytic material upon the impregnated carrier may be varied within wide limits. For example, the alumina content of impregnated silica gel or carbon may be from 1 to 10%, but preferably a concentration of from 2 to 5% is employed.

As supporting materials suitable for the preparation of dehydration catalysts, we may use highly porous materials, such as fuller's earth, diatomaceous earth, active carbon, silica gel, diatomite brick, unglazed porcelain or natural clays, silicates, or other siliceous minerals.

We may impregnate any of these with metallic oxides, such as boric anhydride, tungstic oxide, thoria, or alumina; or we may use acids such as sulphuric acid or phosphoric acid or salts of these, such as ammonium phosphate or ammonium borate.

The temperatures used in outgassing are dependent somewhat upon the nature of the material treated. Ordinarily, a temperature between 300-500° C. is suitable for effecting the removal of adsorbed gases and liquids. Similarly the vacuum required may be altered within wide limits, depending on the adsorptive power of the supporting material, but for most supports we prefer to employ pressures less than 10 mm. of mercury. By the term outgassing, we of course refer to the removal of absorbed, adsorbed, occluded or dissolved gases or liquids from the supporting material by heating to a temperature sufficient to drive off the gaseous matter, continuously maintaining a substantial vacuum and pumping off the evolved gases.

The impregnated catalysts which are the subject of this invention may be employed in a number of vapor phase processes, including those wherein oxides are ordinarily employed. They are, however, particularly suitable for catalytic reactions involving the dehydration of organic compounds, such as the formation of dimethyl ether from methanol, or ethylene from ethanol. They are also suitable for the vapor phase hydrolysis of esters or ethers, the esterification of alcohols and acids and the hydrolysis of nitriles or amids to acids.

As an example of the use of these catalysts, a composition prepared as described in Example 1 was employed in the direct synthesis of normal butylamines from butanol and ammonia. The two reactants were passed over the catalyst at atmospheric pressure and at a temperature of 325° C. in the ratio of 1 mole of butanol vapor per 2.5 moles of ammonia. With a time of contact of 2.5 seconds the conversion of butanol to butylamines was about 30%, with negligible losses of either the ammonia or alcohol to side products.

In addition to the several advantages already set forth, the method of the present invention is cheap and convenient to operate and gives a product of high activity. In certain cases, it permits the preparation of catalysts having higher concentrations of catalytically active material than are ordinarily or otherwise obtainable. For example, in using phosphoric acid supported on active charcoal as a catalyst, it has been found that by following the above described procedure it is possible to introduce into the carbon about 16% of the acid from a dilute solution, whereas, by merely soaking the active carbon in the acid, only 10% is introduced. In the absence of outgassing, the impregnating material becomes concentrated at the openings of the pores of the supporting material and a non-uniform distribution results.

Gels prepared according to ordinary methods have a marked tendency to shatter when immersed in the impregnating liquid and, as indicated above, it has heretofore been considered necessary that the gel contain a considerable proportion of moisture. One of the particular advantages of the porous materials, prepared in accordance with our invention is the absence of shattering in the presence of the impregnating solution. The materials prepared as indicated herein are found to be entirely free from this undesirable characteristic and do not require the presence of moisture therein to prevent its occurrence.

In conducting the preparation of repeat batches of catalysts according to the present method, economy of materials is effected through reuse of the impregnating solution. For a second preparation, it is only necessary to add the desired additional salt of the catalytic metal to the liquid drained from the first preparation to restore the concentration to that of the original impregnating solution.

As many apparently and widely different embodiments of this invention may be made without departing from the spirit and scope thereof, it is to be understood that we do not limit ourselves to the specific embodiments thereof except as defined in the appended claims.

We claim:

1. A process for producing an impregnated porous catalyst composition which comprises heating a porous supporting material in a vacuum to drive off and remove absorbed and adsorbed gases and liquids, and thereafter immersing said material, maintained under vacuum, in a solution of the catalytic substance.

2. The process of producing a porous rigid silica gel impregnated with alumina, which comprises heating said gel at a temperature of about 400° C., and a pressure of less than one mm. for about four hours, cooling to room temperature, and impregnating said gel with a solution of aluminum nitrate while maintaining said pressure, and thereafter drying and igniting the impregnated gel at a temperature of 400-450° C. for about four hours.

3. In the process of preparing a catalyst comprising a gel impregnated with a catalytic compound, the step which comprises subjecting a dry, hard, rigid gel to a vacuum for a period sufficient to drive off occluded gases, prior to impregnation, then impregnating the gel with a solution of a catalytic compound while maintaining said gel under a vacuum.

4. In the process of preparing a catalyst comprising silica gel impregnated with a catalytic compound, the step which comprises subjecting a dry, hard, rigid silica gel to a vacuum for a period sufficient to drive off occluded gases, prior to impregnation, then impregnating the gel with a solution of a catalytic compound while maintaining said gel under a vacuum.

5. In the process of preparing a catalyst comprising silica gel impregnated with a catalytic compound, the step which comprises subjecting a dry, hard, rigid silica gel to a vacuum of less than 10 mm. of mercury for a period sufficient to drive off occluded gases, prior to impregnation, then impregnating the gel with a solution of a catalytic compound while maintaining said gel under a vacuum.

6. In the process of preparing a catalyst comprising silica gel impregnated with a catalytic compound, the step which comprises heating a dry, hard, rigid silica gel at a temperature of 300-500° C. under a vacuum for a period sufficient to drive off occluded gases, prior to impregnation, then impregnating the gel with a solution of a catalytic compound while maintaining said gel under a vacuum.

7. The process of producing a catalyst comprising activated carbon impregnated with a catalytic compound which comprises heating activated carbon at a temperature of 400° C. and under a reduced pressure of about one mm. of mercury for about eight hours, cooling the evacuated charcoal, impregnating the same, while still maintaining said reduced pressure, with a solution of a catalytic compound, and thereafter drying said impregnated charcoal and igniting the same at a temperature of 400° C.

8. A porous, rigid silica gel which has been impregnated under a vacuum with a solution of a catalytic compound.

9. A porous activated carbon which has been impregnated under a vacuum with a solution of a catalytic compound.

10. A porous, rigid catalyst composition which has been prepared by removing occluded gaseous and liquid material from the pores of a porous supporting body by subjecting the same to a vacuum, impregnating said supporting body with a solution of a catalytic compound, while still maintaining said supporting body under a vacuum, then drying the impregnated material.

11. A porous, rigid silica gel which has been prepared by removing occluded gaseous and liquid material from the pores of a dry, rigid, silica gel supporting body by subjecting the gel to a vacuum, impregnating the gel with a solution of a catalytic compound while maintaining said gel under a vacuum, then drying the impregnated gel.

12. Activated carbon which has been prepared by removing occluded gaseous and liquid material from the pores of an activated carbon supporting body by subjecting the carbon to a vacuum, impregnating the carbon with a solution of a catalytic compound while maintaining said activated carbon under a vacuum, then drying the impregnated activated carbon.

13. A porous, rigid catalyst composition obtained by heating a porous supporting body at a temperature of 300° C.–500° C. and under reduced pressure for a period sufficient to remove occluded gases and liquids from the pores thereof, impregnating said porous body with a solution of a catalytic compound while maintaining a reduced pressure, then drying and igniting said impregnated porous supporting body.

14. A porous, rigid silica gel catalyst composition obtained by heating a dry, rigid silica gel at a temperature of 300° C.–500° C. and under reduced pressure for a period sufficient to remove occluded gases from the pores thereof, impregnating said gel with a solution of a catalytic compound while still maintaining a reduced pressure, then drying and igniting the impregnated gel.

HERRICK R. ARNOLD.
WILBUR A. LAZIER.